United States Patent
Stolin et al.

[11] 3,823,928
[45] July 16, 1974

[54] TORCH HEIGHT CONTROL FOR FLAME CUTTING MACHINES

[75] Inventors: Billy L. Stolin, Manito; Ronald D. Brown, Peoria, both of Ill.

[73] Assignee: Caterpillar Tractor Co., Peoria, Ill.

[22] Filed: Dec. 1, 1972

[21] Appl. No.: 311,330

[52] U.S. Cl. .............................. 266/23 M, 219/131
[51] Int. Cl. ............................................. B23k 7/10
[58] Field of Search ........ 266/23 M, 23 R; 164/154, 164/263; 318/333; 219/31 F, 131

[56] References Cited
UNITED STATES PATENTS

| | | | |
|---|---|---|---|
| 2,364,645 | 12/1944 | Mott et al. | 266/23 M |
| 2,949,391 | 8/1960 | Anderson | 266/23 M |
| 3,054,924 | 9/1962 | Wetzger et al. | 318/333 |
| 3,233,076 | 2/1966 | Vilkas | 219/131 F |
| 3,398,342 | 8/1968 | Redman | 266/23 M |
| 3,596,892 | 8/1971 | Nakanishi et al. | 266/23 M |
| 3,746,326 | 7/1973 | Wirth et al. | 266/23 M |

*Primary Examiner*—Roy Lake
*Assistant Examiner*—Paul A. Bell
*Attorney, Agent, or Firm*—Philips, Moore, Weissenberger Lempio & Strabala

[57] ABSTRACT

A flame cutting machine having motor means for traveling one or more gas operated cutting torches along one or more workpieces includes a flame height control for maintaining each torch at a predetermined precise spacing from the workpiece. The height control does not require any mechanical element extending between the torch and the workpiece to sense spacing and is insensitive to surface conditions of the workpiece. Torch to workpiece spacing is sensed at the point of contact of the flame with the workpiece rather than at an adjacent area. An electrical voltage is applied between each torch and the associated workpiece whereby the cutting flame constitutes an electrical resistor, the resistance of which is a function of torch to workpiece spacing. The voltage drop across each flame is continually compared with a predetermined selectable reference voltage indicative of desired torch to workpiece spacing and correction signals are generated when necessary to actuate a servomotor that restores the desired spacing of the torch and associated workpiece. Means are also provided for maintaining different torch to workpiece spacings for preheating and cutting stages of operation and for manually adjusting all torches jointly or any selected torch individually and further means disable the automatic flame height control system in response to a pronounced increase in the electrical resistance of any flame such as occurs if a torch passes off the edge of a workpiece.

6 Claims, 2 Drawing Figures

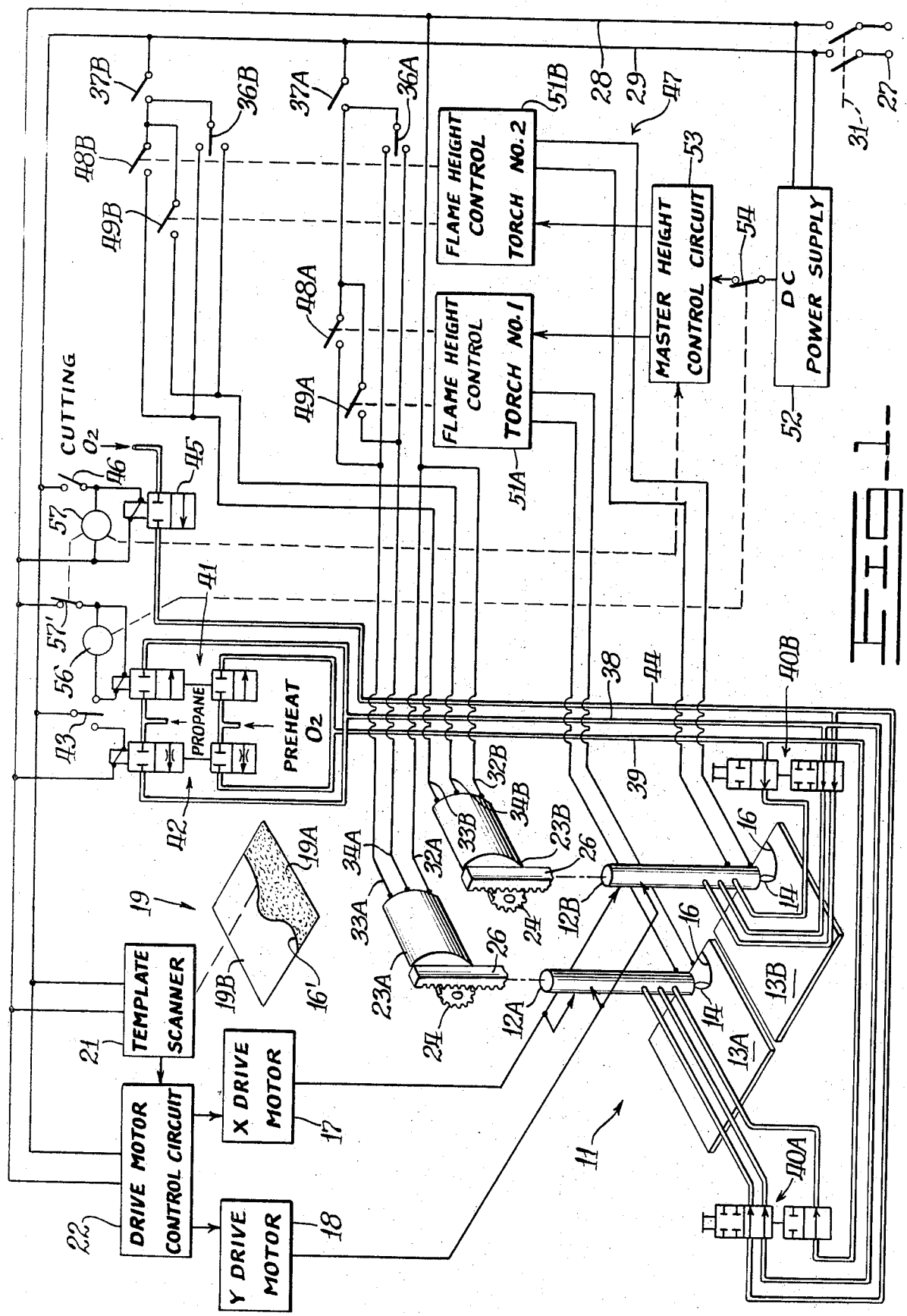

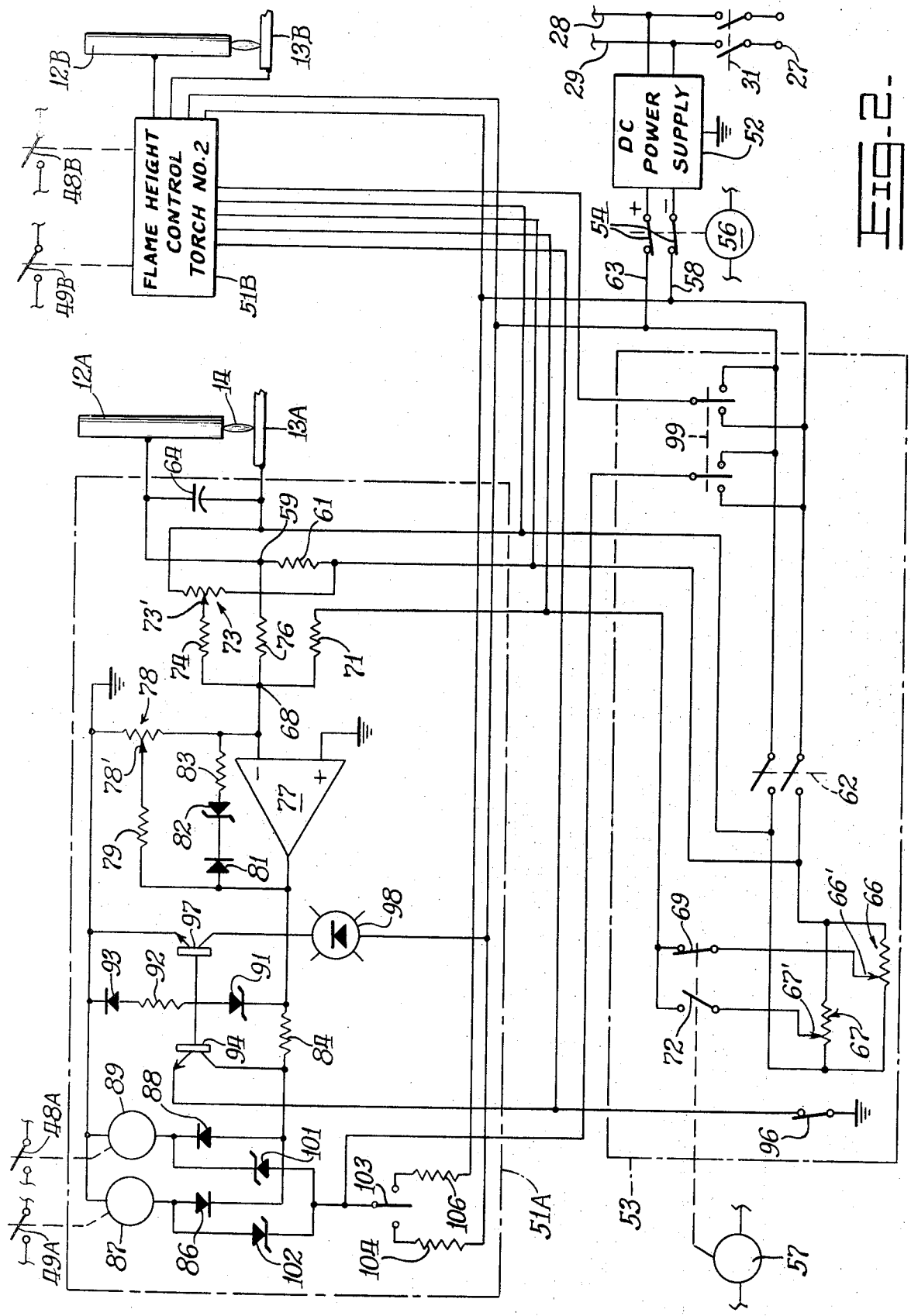

TORCH HEIGHT CONTROL FOR FLAME CUTTING MACHINES

BACKGROUND OF THE INVENTION

This invention relates to flame cutting machines which have one or more gas fueled torches for cutting workpieces and more particularly to control systems for adjusting the spacing of cutting torches from workpieces and for maintaining a preferred spacing therebetween during cutting operations.

In a flame cutting machine one or more gas operated cutting torches are acted on by a drive mechanism which causes the torches to cut along one or more workpieces in accordance with a predetermined pattern. Efficient use of such machines is dependent on maintaining a precise optimum flame height or spacing of the torch from the associated workpiece as heat concentration varies substantially along the length of the flame. If the torch to workpiece spacing varies significantly in the course of cutting a workpiece, a non-uniform or possibly incomplete cut may be made and heat utilization becomes less efficient. The need for adjustment of torch height in the course of a cutting operation may arise from the fact that the workpiece has a non-planar configuration. Moreover, sensitivity is such that slight unintentional irregularities in the surface of nominally flat plate stock may significantly affect cutting efficiency and accuracy.

In some prior flame cutting machines, adjustment of the flame height during the course of a cutting operation, must be done manually by an operator who continually observes the cutting operation. A fully manual flame height control system has several disadvantages. First, more or less continual attention is required and the operator is thereby prevented from accomplishing other tasks during the sometimes lengthy cutting operations. Second, the operator's task becomes more difficult, and quality of results is adversely affected in proportion to the number of torches employed on the cutting machine. Finally, the quality of the flame height control varies widely among different operators and is less than optimum under the best of circumstances. For these reasons, flame cutting machines are frequently provided with means for automatically controlling torch height during cutting operations.

Such automatic control requires a servomotor for advancing or retracting the torch relative to the workpiece in response to control signals and further requiring means for sensing the spacing of the torch from the workpiece surface in order to transmit corrective control signals to the servomotor when necessary.

Torch to workpece spacing sensing means employed in prior automatic torch height controls have included a variety of wheels, rollers, runners, sliding contacts and electrical capacitance measuring plates which extend from the torch towards the workpiece. These systems are complex, prone to malfunction and maintenance problems and are inherently susceptible to error in the presence of varying conditions, such as slag popping, at the surface of the workpiece. Moreover, such devices do not sense the spacing of the workpiece from the torch at the precise point of contact of the flame therewith but are instead displaced to one side of the flame.

Ideally, the sensor means employed in an automatic torch height control should not require any mechanism extending from the torch to the surface of the workpiece and should act to sense changes in the spacing of the torch and workpiece at the precise point of contact of the flame with the workpiece. Further, such means should individually control each torch in a multiple bank thereof while providing for manual adjustment of the spacing to be maintained at all torches and for manually initiated raising or lowering of all torches simultaneously or with respect to any particular torch individually.

SUMMARY OF THE INVENTION

This invention is a system for maintaining a predetermined selectable torch to workpiece spacing in a flame cutting machine which does not require sensor structure extending from the torch to the workpiece. The system is sensitive to minute changes in spacing of the torch from the precise point of contact of the flame with the workpiece. For this purpose, an electrical voltage is applied between the torch and the workpiece whereby an electrical current travels through the cutting flame. The flame is then effectively a variable electrical resistor, the resistance of which is a function of the spacing of the workpiece from the torch. During operation, any variation of the electrical resistance of the flame is detected and a correction signal is generated to actuate a servomotor which restores the torch to workpiece spacing to the desired value.

In a preferred form of the invention, a plurality of torches are utilized and the height control system provides for manual selection of a basic reference voltage that determines the automatically maintained spacing at all torches from the associated workpieces while further providing for individual fine adjustment of torch to workpiece spacing at each torch. Also in the preferred form, the control system provides for automatic shifting from a first torch height to a second torch height when the flame controls are shifted from a preheating fuel to the cutting fuel mixture and still further provides safety shutdown means for preventing the automatic height control system from driving a torch towards the workpiece when the flame lengthens abruptly as a result of passing off the edge of the workpiece.

Accordingly, it is an object of this invention to provide for more efficient utilization of flame cutting machines by providing for a more precise, reliable and versatile automatic control of torch to workpiece spacing during cutting operations.

It is another object of this invention to provide an automatic torch to workpiece spacing control system which does not require mechanical structure extending from the torch towards the workpiece and which detects torch to workpiece spacing at the precise point of contact of the flame with the workpiece.

It is still another object of the invention to provide a flame cutting machine which has means maintaining a selected spacing between one or more cutting torches and one or more workpieces and which prevents excessive torch movement in the direction of the workpieces when a torch passes off the edge of a workpiece or over a discontinuity therein.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is a diagrammatic view of salient components of a flame cutting machine including torch to workpiece spacing control means in accordance with the invention, and FIG. 2 is an electrical circuit diagram showing the detailed circuit configuration of certain components shown in block form in FIG. 1.

DESCRIPTION OF A PREFERRED EMBODIMENT

Referring initially to FIG. 1 of the drawings, suitable detailed structure for a basic flame cutting machine 11 is well known to the art and accordingly only certain principal components thereof, with which the present invention directly coacts, are shown in FIG. 1 in diagrammatic form. Such a cutting machine 11 may include first and second cutting torches 12A and 12B respectively, it being understood that features of the invention are applicable to the control of a single cutting torch and to the control of larger numbers of torches in a flame cutting machine.

Each such torch 12A and 12B is disposed above workpieces 13A and 13B respectively and in operation a gas flame 14 is directed downwardly from each such torch to cut through the associated workpiece by melting along a cut line 16 which may be non-linear if desired. To travel the cutting torches 12 along the desired cut line, an X-axis drive motor 17 simultaneously moves all torches in a first direction which is parallel to the surface of the workpieces while a Y-axis drive motor 18 travels all torches in a direction at right angles to the motion provided by the X drive motor. Control of the X and Y drive motors 17 and 18 to accomplish a desired pattern of cutting may be realized with any of a variety of means known to the art. The example depicted in FIG. 1 is of the form utilizing a template 19 having an opaque area 19A adjacent a relatively light area 19B with the boundary 16' therebetween defining the pattern of the cut. Template 19 is scanned by a suitable scanning means 21 which is coupled to a drive motor control circuit 22 that in turn actuates the X and Y drive motors 17 and 18 to cause the torches 12 to follow a path corresponding to boundary 16' on the template. Other known means may be used for controlling the horizontal motion of the torches such as a special purpose computer having the coordinates of successive points along the cut stored therein in digital signal form or the like.

Flame cutting machines of the form adapted for automatic flame height control are also equipped with servomotors 23A and 23B for controlling the spacing of the torches 12A and 12B respectively relative to the surfaces of workpieces 13A and 13B respectively in response to control signals, each motor being coupled to an individual torch by suitable drive means such as a pinion gear 24 which engage a rack 26 coupled to associated torch. The servomotors 23 in this example are operated by alternating current received from a pair of AC input terminals 27 through AC conductors 28 and 29 and a master on/off switch 31.

Motors 23A and 23B each have a first terminal 32A and 32B respectively connected to AC conductor 28, a second terminal 33A and 33B respectively which is energized to raise the associated torch, and third terminals 34A and 34B respectively which may be energized to lower the associated torch. The second and third terminals of motors 23A and 23B are selectively connectable to the other AC conductor 29 through three-position control switches 36A and 36B respectively to manually initiate raising or lowering of either torch. To provide for inactivation of the servomotor of any specific torch when less than all of the torches in the bank are to be utilized, additional switches 37A and 37B are connected between AC conductor 29 and switches 36A and 36B respectively.

To supply fuel gas and oxygen to torches 12 to establish the flames 14, a fuel gas conduit 38 and low pressure oxygen conduit 39 connect with each torch through a separate one of a pair of manual valves 40 which provide for blocking the flow of fuel to a particular torch if it is not to be utilized in a cutting operation. In flame cutting machines, it is customary to preheat the workpieces 13 prior to the actual cutting operations. This is accomplished by positioning the torches 12 over a selected point on the workpieces while supplying a combustible mixture of fuel gas, such as propane, and low pressure oxygen thereto and the ignited torches generally are held stationary for a period of time until the workpieces are raised to an elevated temperature. A high preheat stage is followed by a normal preheat stage using reduced fuel gas and oxygen flow. Following the preheat period, the flow of fuel gas and oxygen to the torches is continued at the normal preheat rate but high pressure cutting oxygen is also supplied thereto by a conduit 44, resulting in hotter flames 14, and the drive motor control circuit 22 is activated to begin the cutting operation. Thus, provision must be made for supplying combustible fuel elements to conduits 38 and 39 at two different pressures, a relatively high pressure for the high preheat stage and a relatively low pressure for the normal preheat and the cutting stages.

Two electrically actuated solenoid valves 41 and 42 may be used for this purpose, each valve having inlets to which combustible elements are supplied at constant pressure and each has outlets connected to conduits 38 and 39. Each solenoid valve 41 and 42 has a closed position and each may be electrically actuated to an open position to supply fuel gas and oxygen to conduits 38 and 39 respectively but the flow passages through valve 42 are constricted relative to the flow passages through valve 41. Thus, valve 41 may be opened during the high preheat stage of operation while valve 42 is opened during the normal preheat and cutting stages. To provide for selective opening of valves 41 and 42 each such valve is electrically connected across AC conductors 28 and 29 through a single three position control switch 43 which has an off position at which both valves are unenergized and which may be manually operated to energize a single one of the valves at a particular time.

To supply high pressure oxygen to the torches 12 during the cutting stage, an additional conduit 44 connects to each torch through the previously described individual shutoff valve 40 associated therewith. Oxygen is supplied to conduit 44 through an additional two position solenoid valve 45 when the solenoid valve is in the energized condition. Valve 45 may be energized for this purpose by closing a manual switch 46 through which the solenoid valve is connected across AC conductors 28 and 29.

The flame cutting machine 11 as described to this point can be utilized in the conventional manner provided that an operator manually maintains an adequate torch height throughout the cutting operation by observing the torches 12 and by operating the manual torch height control switches 36 as necessary. As hereinbefore discussed, there are disadvantages to manual control from the standpoint of efficiency and quality of work. Accordingly, the present invention provides a height control circuit 47 which may be activated to optimize results and to free the operator for other tasks.

In order to provide for automatic torch height control by circuit 47, alternate means for energizing the terminals 33 and 34 of the servomotors 23 are provided. In particular, normally open contacts 48A and 48B are connected between servomotor terminals 33A and 33B respectively and switches 37A and 37B respectively. Similarly, normally open relay contacts 49A and 49B are connected between motor terminals 34A and 34B and switches 37A and 37B respectively. Accordingly, servomotor 23A may be caused to raise torch 12A by closure of relay contacts 48A or to lower torch 12A by closure of relay contacts 49A while motor 23B may be caused to raise torch 12B by closure of relay contacts 48B or to lower torch 12B by closure of relay contacts 49B.

Relay contacts 48A and 49A are controlled during the automatic mode of operation by a first flame height control 51A and relay contacts 48B and 49B are controlled by a second flame height control 51B, the detailed circuit of the flame height controls 51 being hereinafter described. Flame height controls 51 are direct current circuits and accordingly a DC power supply 52 has input terminals connected to AC conductors 28 and 29 respectively and rectifies, reduces and regulates the AC voltage to provide DC energization to the flame height controls through a master height control circuit 53 which will also be hereinafter described in detail.

Additional normally closed relay contacts 54 between the power supply 52 and master height control circuit 53 are opened by energization of a driver coil 56 connected across AC conductors 28 and 29 through manual switch 43 in parallel with solenoid valve 41. Thus, contacts 54 are opened to block servomotor actuation by height control circuit 47 during periods when the high preheat solenoid valve 41 is energized. As previously described, torches 12 are stationary over a selected area of the workpiece during the high preheat stage of operation; therefore, torch to workpiece separation will not change from an initial setting and automatic height control is not needed. Further, critical adjustments in height control system 47 are intended to provide automatic positioning during normal preheat and cutting operations when stable oxygen-fuel gas ratios and hence stable flame resistances prevail. During high preheat the higher pressure and volume of fuel gas and oxygen to the torches would alter such oxygen-fuel gas ratio in the absence of circuit additions for compensating purposes. An additional relay driver coil 57 is connected across AC conductors 28 and 29 through cutting oxygen control switch 46 and thus is energized when the cutting oxygen supply solenoid valve 45 is energized. Relay driver 57 opens a normally closed contact 57' to insure that solenoid valve 41 cannot operate after the cutting oxygen supply solenoid valve 45 is energized and further provides a signal to the master height control circuit 53, to mark the start of the cutting stage of operation, for purposes to be hereinafter described.

Considering now the circuit of the height control system 47 in more detail, reference should be made to FIG. 2. Inasmuch as the flame height control circuits 51A and 51B may be essentially similar, only circuit 51A is shown in detail.

The flame 14 of torch 12A constitutes a variable resistor from the electrical standpoint and the resistance of the flame is a function of the spacing of the torch and workpiece 13A. More specifically, the electrical resistance of flame 14 decreases as the torch 12A is brought closer to the workpiece 13A and increases as the torch is retracted from the workpiece. Thus, by detecting departure of the resistance of flame 14 from a predetermined value, a correction signal may be derived to actuate the previously described relay contacts 48A and 49A to raise or lower the torch 12A as necessary to restore the original torch to workpiece spacing. For this purpose, the torch 12A is connected to the negative output terminal 58 of power supply 52 through a circuit junction 59 and voltage divider resistor 61 of flame height control 51A and through one arm of a double pole switch 62 of the master control circuit 53. Switch 62 may be closed to activate the automatic height control system and may be opened to disable the system and thereby provide for manual torch height control only.

Workpiece 13A is connected to the positive output terminal 63 of DC power supply 52 through the other arm of switch 62. Thus, with switch 62 closed to activate the automatic height control system, a constant voltage is applied to the circuit comprised of resistor 61, circuit junction 59, torch 12A, flame 14 and workpiece 13. Under this condition, resistor 61 and flame 14 jointly constitute a voltage divider wherein the voltage at circuit junction 59 is dependent on the spacing of the torch from the workpiece since resistor 61 remains constant while the effective resistance of flame 14 decreases if the torch moves toward the workpiece and increases if the torch moves away from the workpiece. A capacitor 64 is connected between torch 12A and workpiece 13A to prevent high frequency fluctuations, which may arise from momentary flame aberrations, sputtering or other causes, from significantly affecting the voltage at circuit junction 59.

In order to derive a correction signal to maintain the torch to workpiece spacing at a predetermined value, the voltage at circuit junction 59 is compared with a predetermined reference voltage indicative of the desired spacing. For this purpose, a pair of potentiometers 66 and 67 of master height control circuit 53 are connected across the output terminals 58 and 63 of power supply 52 through switch 62. Potentiometer 66 provides the basic reference voltage during the previously described normal preheat stage of operation and for this purpose has a movable contact 66' connected to a summing junction 68 of flame height control 51A through a set of normally closed relay contacts 69 and through an input resistor 71 to the summing junction. The other potentiometer 67 provides the basic reference voltage during the cutting stage of operation and has a movable contact 67' connected to summing junction 68 through a set of normally open contacts 72 and the input resistor 71. Relay contacts 69 and 72 are both operated by energization of the previously described driver coil 57 which is energized concurrently with energization of the cutting oxygen supply valve. Thus, during the normal preheat stage of operation, when the cutting oxygen supply valve is unenergized, the basic reference voltage signal is provided to summing junction 68 through contacts 69. Upon opening of the cutting oxygen valve to initiate the cutting stage, contacts 69 open while contacts 72 are closed so that a new reference voltage is applied to summing junction 68 from the other potentiometer 67. Manual adjustment of either potentiometer 66 and 67 enables the operator to selectively vary the basic reference voltage for either stage of operation and thus provides for selection of a different torch to workpiece spacing for each stage.

The basic reference voltage from potentiometer 66 or 67 of master height control circuit 53 is provided at all flame height controls 51. Individual variations of circuit characteristics in each specific flame height control and associated torch may require slight differences in the reference voltage applied to the respective summing junctions 68 in order to achieve the same torch to workpiece spacing at each torch. Accordingly, each flame height control 51 has a fine adjustment potentiometer 73 connected across DC power supply terminals 58 and 63 through switch 62 and has a movable contact 73' connected to summing junction 68 through another input resistor 74. Once fine adjustment potentiometer 73 is adjusted to compensate for individual characteristics of the associated flame height control circuit, then simultaneous adjustment of the torch to workpiece spacing for all torches may be accomplished by adjustment of the potentiometers 66 and 67 of the master height control circuit.

Circuit junction 59 is connected to the summing junction 68 through another input resistor 76 and thus the voltage at the summing junction is the algebraic sum of the voltage from circuit junction 59 and the reference voltages received through input resistors 71 and 74. For any selected level of reference voltage, there exists a particular torch to workpiece spacing at which the voltage from circuit junction 59 is of equal magnitude and of opposite polarity and therefore cancels out the reference voltage to provide circuit ground potential at summing junction 68. If the torch to workpiece spacing deviates from this particular value, then a voltage appears at summing junction 68 having a polarity indicative of the direction of such deviation and having a magnitude indicative of the amount thereof.

To provide a means for detecting the voltage variation, summing junction 68 is connected to the inverting input of an operational amplifier 77 which has the positive or noninverting input connected to circuit ground. Thus, an amplified correction signal appears at the output of amplifier 77 whenever the torch to workpiece spacing deviates from the value determined by the reference voltages from the master height control circuit 53 and fine adjustment potentiometer 73. A gain adjustment potentiometer 78 is connected between the inverting input of amplifier 77 and circuit ground and has a movable contact 78' connected to the amplifier output through a resistance 79 to provide for control of the sensitivity of response of the automatic system to variations in torch to workpiece spacing. A feedback network including a diode 81, Zener diode 82 and resistor 83 is connected between the inverting input and the output of amplifier 77 to provide degenerative feedback. This limits the maximum output voltage from the amplifier as determined by the breakdown voltage of the Zener diode 82.

The output of amplifier 77 is connected to circuit ground through a resistor 84, diode 86 and a relay driver coil 87 which operates the previously described relay contacts 49A that initiate downward motion of the torch 12A. The amplifier 77 output is also connected to circuit ground through resistor 84, an additional diode 88 and an additional relay driver coil 89 which operates the previously described relay contacts 48A that initiate upward motion of the torch 12A. Diodes 86 and 88 are inverted relative to each other so that a positive output from amplifier 77 energizes driver coil 89 only while a negative output from the amplifier energizes driver coil 87 only. Accordingly, the torch 12A is raised or lowered depending on the polarity of the correction signal output from amplifier 77. This polarity in turn depends upon the direction of deviation of the torch to workpiece spacing from the predetermined value and the particular relay 48A or 49A which is closed as a result of a correction signal is the one which acts to move the torch in a direction tending to eliminate the deviation. When the deviation has been eliminated and the desired torch to workpiece spacing restored, the output of amplifier 77 is at circuit ground potential. Both relay drivers 87 and 89 are then de-energized and relay contacts 48A and 49A are both open. Accordingly, the activated flame height control 51A continually maintains the desired torch to workpiece spacing and further provides for manual readjustment of this spacing at any time by means of the potentiometers 66 and 67.

Flame height control 51A further includes a safety provision for preventing potential damage to a torch, workpiece or other adjacent mechanism. In the absence of corrective provisions, passage of the flame 14 off of an edge of the workpiece 13A, or over a flaw or discontinuity therein would cause the output of amplifier 77 to rise abruptly and remain at an elevated value in an attempt to drive the torch 12A towards the workpiece to correct for an apparent increase in the spacing therebetween. This is prevented by connection of a Zener diode 91, resistor 92 and diode 93 in series relationship between the output of amplifier 77 and circuit ground. A first transistor 94 has a collector connected to the output of the amplifier through resistor 84 and an emitter connected with ground through a normally closed switch 96 in the master height control circuit 53 and further has a base connected to the junction between Zener diode 91 and resistor 92. A second transistor 97 has an emitter-collector circuit connected between positive power supply terminal 63 and circuit ground in series with a light emitting diode 98 and has a base also connected to the junction between Zener diode 91 and resistor 92. When the output of amplifier 77 is positive and reaches a predetermined abnormally high magnitude indicative of the undesirable conditions discussed above, Zener diode 91 breaks down and conducts. This biases both transistors 94 and 97 into conduction. Conduction through transistor 94 grounds the output of the amplifier 77 preventing continued energization of driver coil 89 and thereby stopping downward motion of the torch 12A. Simultaneously, conduction through the other transistor 97 lights the diode lamp 98 to provide a visual indication that the automatic torch control has been disabled. Switch 96 may be opened to selectively inactivate the safety shutdown circuit if it is desired to deliberately lower the torch 12A under conditions which would otherwise cause automatic shutdown as described above.

To provide for manual override of the automatic control system with respect to raising and lowering all torches simultaneously, a three position master manual switch 99 at master height control circuit 53 has an open position and may be moved to a second position at which positive power supply terminal 63 is connected to relay driver 89 through a Zener diode 101 and has a third position at which negative power supply terminal 58 is connected to relay driver 87 through an inverted Zener diode 102. As the master manual switch 99 provides for simultaneous raising or lowering of all torches 12, an additional three position manual switch 103 is provided for individually raising and lowering each specific torch 12. Switch 103 has an open position and has a first position at which positive power supply terminal 63 is connected to Zener diode 101 through a resistor 104 and a third position at which the negative power supply terminal 58 is connected to Zener diode 102 through a resistor 106.

The second flame height control 51B as well as any additional flame height controls which may be present for additional torches may be similar to the above described flame height control 51A and thus all connections between the master height control circuit 53 and flame height control 51A are branched to go to flame height control 51B as well as 51A with the exception of the connection to the master manual switch 99. Master manual switch 99 requires separate electrical connection to each flame height control 51 to prevent operation of the switch 103 of a particular flame height control from energizing the driver coils 87 or 89 of other flame height controls through a shared conductor to switch 99.

While the invention has been described with respect to a particular embodiment, it will be apparent that many variations are possible and it is not intended to limit the invention except as defined in the following claims.

What is claimed is:

1. A system for maintaining at least one cutting torch in a flame cutting machine at a predetermined distance from a workpiece comprising:
   motor means for advancing said torch toward said workpiece and for retracting said torch away therefrom in response to control signals,
   an electrical power supply having first and second output terminals,
   conductive means connecting said torch to said first power supply terminal and connecting said workpiece to said second power supply terminal whereby an electrical current passes through the flame of said torch and said flame becomes a variable electrical resistor, the resistance of which is a function of the spacing of said torch from said workpiece, wherein said conductive means comprises a voltage divider resistor and a circuit junction connected between one of said power supply terminals and one of said torch and said workpiece to form a voltage divider in conjunction with said flame whereby the electrical voltage at said circuit junction varies in accordance with said variations of said electrical resistance of said flame,
   means for producing a reference voltage,
   control signal means for actuating said motor means in response to variations of said resistance of said flame,
   detector means for sensingg changes of said electrical resistance of said flame, wherein said detector means is connected between said control signal means and said circuit junction and has means for actuating said control signal means in response to variations of said voltage at said circuit junction, and wherein said detector means includes means for comparing said voltage at said circuit junction with said reference voltage and for actuating said control signal means when said circuit junction voltage departs from a predetermined relationship to said reference voltage, and
   safety shutdown means for blocking actuation of said motor means in response to said detector means when said circuit junction voltage departs from predetermined relationship to said reference voltage by a predetermined amount.

2. The combination defined in claim 1 further comprising manually operable switch means for selectively disabling said safety shutdown means.

3. A system for maintaining at least one cutting torch in a flame cutting machine at a predetermined distance from a workpiece wherein said flame cutting machine has a switch which is operated following preheating of said workpiece in order to initiate cutting thereof, comprising:
   motor means for advancing said torch toward said workpiece and for retracting said torch away therefrom in response to control signals,
   an electrical power supply having first and second output terminals,
   conductive means connecting said torch to said first power supply terminal and connecting said workpiece to said second power supply terminal whereby an electrical current passes through the flame of said torch and said flame becomes a variable electrical resistor, the resistance of which is a function of the spacing of said torch from said workpiece, wherein said conductive means comprises a voltage divider resistor and a circuit junction connected between one of said power supply terminals and one of said torch and said workpiece to form a voltage divider in conjunction with said flame whereby the electrical voltage at said circuit junction varies in accordance with said variations of said electrical resistance of said flame,
   means for producing a reference voltage wherein said means providing a reference voltage includes a first voltage source providing a first reference voltage for preheating operations of said flame cutting machine and a second voltage source providing a second reference voltage for cutting operations of said flame cutting machine,
   cotrol signal means for actuating said motor means in response to variations of said resistance of said flame,
   detector means for sensing changes of said electrical resistance of said flame, wherein said detector means is connected between said control signal means and said circuit junction and has means for actuating said control signal means in response to variations of said voltage at said circuit junction, and wherein said detector means includes means for comparing said voltage at said circuit junction with said reference voltage and for actuating said control signal means when said circuit junction voltage departs from a predetermined relationship to said reference voltage, and means for transmitting said first reference voltage to said detector means when said switch is unoperated and for transmitting said second reference voltage to said detector means in response to operation of said switch.

4. A system for maintaining at least one cutting torch in a flame cutting machine at a predetermined distance from a workpiece comprising:

motor means for advancing said torch toward said workpiece and for retracting said torch away therefrom in response to control signals, an electrical power supply having first and second output terminals, conductive means connecting said torch to said first power supply terminal and connecting said workpiece to said second power supply terminal whereby an electrical current passes through the flame of said torch and said flame becomes a variable electrical resistor, the resistance of which is a function of the spacing of said torch from said workpiece, wherein said conductive means comprises a voltage divider resistor and a circuit junction connected between one of said power supply terminals and one of said torch and said workpiece to form a voltage divider in conjunction with said flame whereby the electrical voltage at said circuit junction varies in accordance with said variations of said electrical resistance of said flame, means for producing a reference voltage, control signal means for actuating said motor means in response to variations of said resistance of said flame, detector means for sensing changes of said electrical resistance of said flame, wherein said detector means is connected between said control signal means and said circuit junction and has means for actuating said control signal means in response to variations of said voltage at said circuit junction, and wherein said detector means includes means for comparing said voltage at said circuit junction with said reference voltage and for actuating said control signal means when said circuit junction voltage departs from a predetermined relationship to said reference voltage, and wherein said flame cutting machine has a plurality of said torches each having separate ones of said conductive means and detector means connected therewith, and wherein said means providing a reference voltage provides a basic reference voltage to each of said detector means and wherein each of said detector means has a fine control means for selectively modifying said basic reference voltage at that detector means only.

5. A system for controlling the spacing of a plurality of torches from a plurality of workpieces in a flame cutting machine comprising:

a plurality of servomotors for advancing and retracting individual ones of said torches relative to the associated individual ones of said workpieces, each of said servomotors having a terminal which may be energized to retract the associated torch and a second terminal which may be energized to advance the associated torch, a plurality of normally open relay means each connected between a power source and an individual one of said servomotor terminals, a DC power supply having positive and negative output terminals relative to a circuit ground, a plurality of flame height control circuits each controlling an individual pair of said relay contacts which control an individual one of said servomotors, each said flame height control circuit having a circuit junction and having a voltage divider resistor connected between said circuit junction and one of said power supply terminals and having first conductive means connecting said circuit junction with one of said torch and said workpiece and having second conductive means connecting the other of said power supply terminals with the other of said torch and said workpiece whereby said voltage divider resistor and the flame of said torch act as a voltage divider to cause the voltage at said circuit junction to vary in accordance with variations in the spacing of the associated ones of said torches and workpieces, each said flame height control circuit further having a summing junction and means transmitting said voltage at said circuit junction to said summing junction and means transmitting a predetermined reference voltage to said summing junction and having a first relay driver for operating the first of said pair of relay contacts and a second relay driver for operating the second of said relay contacts, each said flame height control circuit still further having an amplifier with an input connected to said summing junction and an output connected to each of said relay drivers through separate unidirectional circuit elements wherein one such element is inverted relative to the other such element whereby a positive output from said amplifier closes a first of said pair of relay contacts and a negative output from said amplifier closes the other of said pair of relay contacts.

6. The combination defined in claim 5 further comprising a master control circuit connected between said power supply and each of said flame height control circuits, said master height control circuit having means for transmitting a selectively variable reference voltage to said summing junction of each of said flame height control circuits and having manual switch means for selectively energizing said first relay drivers of all of said flame height control circuits and for selectively energizing said second relay drivers of all of said flame height control circuits independently of said outputs of said amplifiers.

* * * * *